United States Patent
Gaba et al.

(10) Patent No.: US 10,380,000 B2
(45) Date of Patent: *Aug. 13, 2019

(54) MULTI ENVIRONMENT AWARE DEBUGGER

(71) Applicant: International Business Machines Corporation, Armonk, NY (US)

(72) Inventors: Mansi Gaba, Gurgaon (IN); Gurudayal Khosla, Chhindwara (IN); Shunmugaraja Periadurai, Chennai (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 73 days.

This patent is subject to a terminal disclaimer.

(21) Appl. No.: 15/407,772

(22) Filed: Jan. 17, 2017

(65) Prior Publication Data

US 2018/0203788 A1    Jul. 19, 2018

(51) Int. Cl.
*G06F 11/00*     (2006.01)
*G06F 11/36*     (2006.01)

(52) U.S. Cl.
CPC ...... *G06F 11/3636* (2013.01); *G06F 11/3664* (2013.01)

(58) Field of Classification Search
CPC .............. G06F 11/3636; G06F 11/3664
See application file for complete search history.

(56) References Cited

U.S. PATENT DOCUMENTS

| | | |
|---|---|---|
| 8,769,495 B1 | 7/2014 | Gupta |
| 9,928,055 B1* | 3/2018 | Douberley ........... G06F 8/65 |
| 2011/0047415 A1* | 2/2011 | Nanjundaswamy ........................ G06F 11/3636 714/37 |
| 2011/0154301 A1 | 6/2011 | Klinker et al. |
| 2012/0303595 A1* | 11/2012 | Liu ............... G06F 11/1453 707/692 |
| 2014/0325484 A1* | 10/2014 | Gillaspie ............. G06F 11/3684 717/124 |

(Continued)

OTHER PUBLICATIONS

IBM: List of IBM patents or patent applications treated as related, 2 pg.

(Continued)

*Primary Examiner* — Bryce P Bonzo
*Assistant Examiner* — Katherine Lin
(74) *Attorney, Agent, or Firm* — Cuenot, Forsythe & Kim, LLC

(57) ABSTRACT

Stepwise execution of different instances of an application can be initiated, in parallel, in different computing environments. Responsive to an execution step being performed in the different computing environments, a determination can be made as to whether a first data set generated by an operation performed in the execution step by a first instance of the application matches a second data set generated by the operation performed in the execution step by a second instance of the application. If the data sets do not match, the second data set can be replaced with the first data set in memory of an operating system in which the second instance of the application is executed. At least one additional execution step can be performed. An indication of whether the additional execution step performed properly can be output.

14 Claims, 3 Drawing Sheets

(56) References Cited

U.S. PATENT DOCUMENTS

2016/0124838 A1    5/2016    Feng et al.

OTHER PUBLICATIONS

Gaba, M. et al., "Multi Environment Aware Debugger", U.S. Appl. No. 15/844,615, filed Dec. 17, 2017, 26 pages (Not provided as this application is available to the Examiner.

* cited by examiner

200

Initiate a stepwise execution of a first instance of an application in a first computing environment hosted by a first data processing system and, in parallel, initiating the stepwise execution of a second instance of the application in a second computing environment hosted by a second data processing system, wherein the second computing environment is different than the first computing environment
202

Responsive to an execution step being performed by the first instance of the application and the second instance of the application, determine whether a first data set generated by an operation performed in the execution step by the first instance of the application matches a second data set generated by the operation performed in the execution step by the second instance of the application
204

Responsive to determining that the first data set does not match the second data set, replace, using a processor, in memory of the second data processing system, the second data set with the first data set
206

Responsive to at least one additional execution step being performed by the first instance of the application and the second instance of the application, determine whether a third data set generated by at least one additional operation performed in the at least one additional execution step by the first instance of the application matches a fourth data set generated by the at least one additional operation performed in the at least one additional execution step by the second instance of the application
208

Responsive to determining that the third data set matches the fourth data set, output an indication that the operation that generated the fourth data set performed properly
210

FIG. 2

MULTI ENVIRONMENT AWARE DEBUGGER

BACKGROUND

The present invention relates to data processing, and more specifically, to debugging computer programs.

Debugging is the process of finding and resolving defects that prevent correct operation of a computer program. The difficulty of debugging computer programs varies greatly depending on the complexity of the system being debugged, and debugging complex computer programs can be very difficult. Accordingly, debuggers commonly are used to facilitate the debugging process. Debuggers are software tools which enable a software developer to monitor the execution of a program for debugging purposes.

SUMMARY

A method includes initiating a stepwise execution of a first instance of an application in a first computing environment hosted by a first data processing system and, in parallel, initiating the stepwise execution of a second instance of the application in a second computing environment hosted by a second data processing system, wherein the second computing environment is different than the first computing environment. The method also can include, responsive to an execution step being performed by the first instance of the application and the second instance of the application, determining whether a first data set generated by an operation performed in the execution step by the first instance of the application matches a second data set generated by the operation performed in the execution step by the second instance of the application. The method also can include, responsive to determining that the first data set does not match the second data set, replacing, using a processor, in memory of the second data processing system, the second data set with the first data set. The method also can include, responsive to at least one additional execution step being performed by the first instance of the application and the second instance of the application, determining whether a third data set generated by at least one additional operation performed in the at least one additional execution step by the first instance of the application matches a fourth data set generated by the at least one additional operation performed in the at least one additional execution step by the second instance of the application. The method also can include, responsive to determining that the third data set matches the fourth data set, outputting an indication that the operation that generated the fourth data set performed properly.

A system includes a processor programmed to initiate executable operations. The executable operations include initiating a stepwise execution of a first instance of an application in a first computing environment hosted by a first data processing system and, in parallel, initiating the stepwise execution of a second instance of the application in a second computing environment hosted by a second data processing system, wherein the second computing environment is different than the first computing environment. The executable operations also can include, responsive to an execution step being performed by the first instance of the application and the second instance of the application, determining whether a first data set generated by an operation performed in the execution step by the first instance of the application matches a second data set generated by the operation performed in the execution step by the second instance of the application. The executable operations also can include, responsive to determining that the first data set does not match the second data set, replacing in memory of the second data processing system, the second data set with the first data set. The executable operations also can include, responsive to at least one additional execution step being performed by the first instance of the application and the second instance of the application, determining whether a third data set generated by at least one additional operation performed in the at least one additional execution step by the first instance of the application matches a fourth data set generated by the at least one additional operation performed in the at least one additional execution step by the second instance of the application. The executable operations also can include, responsive to determining that the third data set matches the fourth data set, outputting an indication that the operation that generated the fourth data set performed properly.

A computer program includes a computer readable storage medium having program code stored thereon. The program code is executable by a processor to perform a method. The method includes initiating, by the processor, a stepwise execution of a first instance of an application in a first computing environment hosted by a first data processing system and, in parallel, initiating the stepwise execution of a second instance of the application in a second computing environment hosted by a second data processing system, wherein the second computing environment is different than the first computing environment. The method also can include, responsive to an execution step being performed by the first instance of the application and the second instance of the application, determining, by the processor, whether a first data set generated by an operation performed in the execution step by the first instance of the application matches a second data set generated by the operation performed in the execution step by the second instance of the application. The method also can include, responsive to determining that the first data set does not match the second data set, replacing, by the processor, in memory of the second data processing system, the second data set with the first data set. The method also can include, responsive to at least one additional execution step being performed by the first instance of the application and the second instance of the application, determining, by the processor, whether a third data set generated by at least one additional operation performed in the at least one additional execution step by the first instance of the application matches a fourth data set generated by the at least one additional operation performed in the at least one additional execution step by the second instance of the application. The method also can include, responsive to determining that the third data set matches the fourth data set, outputting, by the processor, an indication that the operation that generated the fourth data set performed properly.

BRIEF DESCRIPTION OF THE DRAWINGS

FIG. 2 is a flow chart illustrating an example of a method of debugging an application.

DETAILED DESCRIPTION

Figure 1:
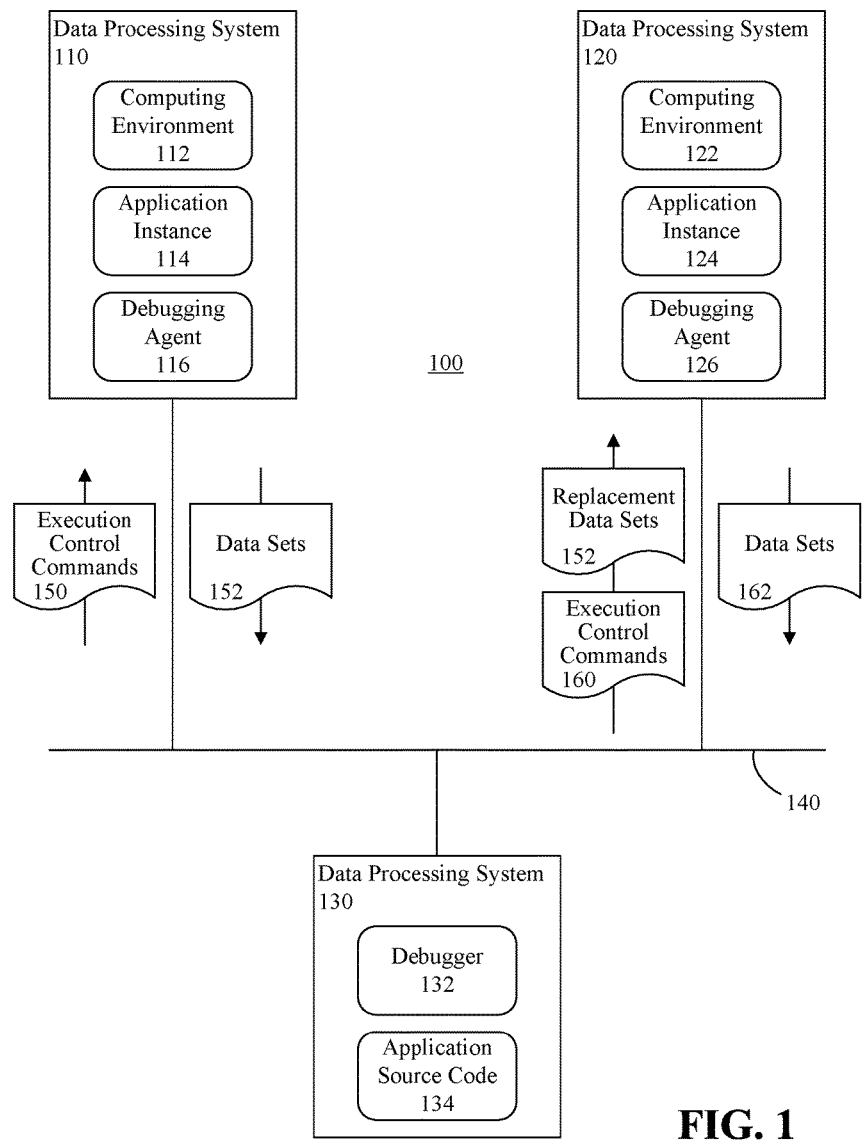
FIG. 1 is a block diagram illustrating an example of a network processing environment.

This disclosure relates to data processing, and more specifically, to debugging computer programs. In accordance with the inventive arrangements disclosed herein, stepwise execution of first and second instances of an application can be initiated in respective computing environments hosted by respective data processing systems. The computing environments can be different. For example, the data processing systems can execute different operating systems, different versions of operating systems, different services, or different application programming interfaces (APIs). In another example, the first instance of the application can be executed using a web browser that is different from a web browser used for execution of the second instance of the application.

During the stepwise execution, data sets generated by the different instances of the application at various execution steps can be compared. If a difference between the data sets is detected, a data set generated by one instance of the application, for example an instance of the application known to be executing properly, can be used to replace a corresponding data set in the other instance of the application. Operations performed in the execution steps in which the data sets differ can be identified, and an output can be generated to indicate such operations, as well as data sets input into the operations and the data sets generated by the operations.

The arrangements described herein can greatly simplify debugging applications that execute properly in some computing environments, but not others. In such cases, it can be very difficult to identify which operations are causing problems. By comparing and replacing data sets as described herein, identifying operations that perform properly in some computing environments and not others is simplified, thus saving application developers a significant amount of time in debugging such applications.

Several definitions that apply throughout this document now will be presented.

As defined herein, the terms "instance of an application" and "application instance" mean an application deployed in a computing environment, wherein at least one other copy of the same application is deployed in another computing environment.

As defined herein, the term "stepwise execution" means to execute an application in discrete steps, wherein execution of the application pauses after each step until the application is instructed to perform a next step.

As defined herein, the term "data set" means a collection of at least one datum stored, at least temporarily, in memory of a data processing system.

As defined herein, the term "debugger" means a software tool (e.g., an application) including software functions used by a software developer to debug a computer program (e.g., an application).

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

FIG. 1 is a block diagram illustrating an example of a network processing environment 100. The network processing environment can include a data processing system 110, a data processing system 120 and a data processing system 130. Each data processing system 110, 120, 130 can include at least one hardware processor and memory.

The data processing system 130 can communicatively link to the data processing systems 110, 120 via at least one network 140. The network 140 is the medium used to provide communications links between various devices and data processing systems connected together within network processing environment 100. The network 140 may include connections, such as wire, wireless communication links, or fiber optic cables. The network 140 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

As defined herein, the term "debugging agent" means software (e.g., an application, service or plugin), deployed to a data processing system, that collects data generated by the data processing system and returns the data to a debugger.

The data processing system 110 can host a computing environment 112 in which an instance of an application, namely application instance 114, is executed, and the data processing system 120 can host a computing environment 122 in which another instance of an application, namely application instance 124, is executed. The application instances 114, 124 can be different instances of the same application. In this regard, a copy of the application can be deployed to the data processing system 110 and another copy of the application can be deployed to the data processing system 120. In one non-limiting arrangement, the data processing system 110 can be a software development server, and the data processing system 120 can be a software testing server.

The computing environments 112, 122 can differ in some manner. In illustration, the computing environment 112 can include an operating system, and the computing environment 122 can include a different operating system. For example, the computing environment 112 can include a Unix® operating system and the computing environment 112 can include a Linux® operating system. In another example, the computing environment 112 can include a particular version of an operating system (e.g., version 4.0), and the computing environment 122 can include a different version of the operating system (e.g., version 4.1). In a further example, the computing environment 112 can be hosted by a web browser, and the computing environment 112 can be hosted by a different web browser. In another example, the computing environment 112 can be hosted by a particular version of a web browser, and the computing environment can be hosted by a different version of the web browser.

In another example, the computing environment 112 can include an API used by the application instance 114 during execution, which is not used by the application instance 124 during execution. Instead, the computing environment 122 can include a different API used by the application instance 124 during execution (e.g., the APIs are not different instances, or copies, of the same API). In a further example, the computing environment 112 can include a service executed by the data processing system 110 during execution of the application instance 114, wherein another instance of that service is not executed by the data processing system 120 during execution of the application instance 124, or the computing environment 122 can include a service executed by the data processing system 120 during execution of the application instance 124, wherein another instance of that service is not executed by the data processing system 110 during execution of the application instance 114.

Notwithstanding the above examples, the computing environment 122 can differ from the computing environment 112 in any other manner that causes the application instance 124 to not execute properly in the computing environment 122, even though the application instances 114, 124 are different instances, or copies, of the same application, and the application instance 114 may execute properly in the computing environment 112.

The data processing system 130 can host a debugger 132. The data processing system 130 can execute the debugger 132 debug the application. More particularly, the debugger 132 can identify operations of the application that do not perform consistently in different computing environments 112, 122. Of course, the debugger 132 also can be configured to perform any of a myriad of other debugging functions.

In other arrangements, the data processing system 110 or the data processing system 120 can host the debugger 132. For example, in an arrangement in which the data processing system 110 is a software development server, the debugger 132 can be hosted on the data processing system 110.

A user (e.g., a software developer) can initiate the debugger 132 to debug the application, or the debugger 132 can be programmed to automatically initiate, for example at a certain time, when certain conditions are met, etc. Initially, the debugger 132, or a user, can deploy a respective debugging agent 116, 126 to each of the data processing systems 110, 120. The debugging agents 116, 126 can be respective instances (e.g., copies) of the same debugging agent, though this need not be the case. For example, if the computing environment 112 includes a different operating system than the computing environment 122, the debugging agents 116, 126 can be configured for the respective operating systems.

Via the debugging agents 116, 126, the debugger 132 can use techniques known in the art to set breakpoints in the respective application instances 114, 124, for example after various operations defined in the application. The debugger 132 can identify the places where to set the breakpoints by analyzing source code 134 of the application. For example, a user can specify one or more processing elements of the application to be tested, and the debugger 132 can set breakpoints between operations included in those processing elements.

Further, the debugger 132 can configure the debugging agents 116, 126 to retrieve data contained in memory of the respective data processing systems 110, 120 in response to the breakpoints being reached during execution of the application instances 114, 124. For example, the debugging agents 116, 126 can be configured to copy, from respective call stacks in memory, a data set input to an operation and a data set output by the operation in response to a breakpoint for an operation being reached during execution of the respective application instance 114, 124. The debugging agents 116, 126 also can use hooks, which are known in the art, to gather data sets input to and output by various operations.

In operation, the debugger 132 can communicate execution control commands 150, 160 to the debugging agents 116, 126 to initiate stepwise execution of the respective application instances 114, 124, in parallel. Responsive to the execution control commands 150, 160, the debugging agents 116, 126 can initiate, in real time, the respective application instances 114, 124 to execute until a breakpoint is reached. Responsive to the breakpoint being reached, the application instances 114, 124 can pause, and the debugging agents 116, 126 can obtain, in real time, from respective memory of the data processing systems 110, 120 or from respective hooks, data sets 152, 162 for at least one operation performed during the execution step, for example data sets 152, 162 input to and/or output by the at least one operation. For example, the debugging agents 116, 126 can copy the data sets 152, 162 from respective call stacks used for execution of the application instances 114, 124. The debugging agents 116, 126 can communicate, in real time, to the debugger 132 the respective data sets 152, 162.

The debugger 132 can compare, in real time, the data set 152 to the data set 162 to determine whether the data set 152 matches the data set 162. The debugger 132 can determine that data set 152 matches the data set 162 if each datum contained in the data set 152 also is contained in the data set 162, and each datum contained in the data set 162 also is contained in the data set 152. If the data set 152 includes at least one datum not included in the data set 162, or the data set 162 includes at least one datum not included in the data set 152, the debugger can determine that the data set 152 does not match the data set 162. In illustration, if both the data set 152 and the data set 162 consist of the same parameter values 1, 3, 7, the debugger 132 can determine that the data sets 152, 162 match. If, on the other hand, the data set 152 consists of parameter values 1, 3, 7, but the data set 162 consists of parameter values 1, 3, 9, the debugger 132 can determine that the data sets 152, 162 do no match.

If the data set 152 matches the data set 162, the debugger 132 can output an indicator indicating that the data sets 152, 162 match, and thus the operation performed properly in the application instances 114, 124. For example, the debugger can present, via a user interface of the data processing system 130 (e.g., a debugger view presented on a display), a view indicating the operation. Optionally, the view also can indicate the data set 152 input to, or output by, the operation in the application instance 114, and the data set 162 input to, or output by, the operation in the application instance 124. In one arrangement, the debugger also can indicate value types for parameter values contained in the respective data sets 152, 162 (e.g., string, integer, etc.).

On the other hand, responsive to receiving at least one data set 152 input to, or output by, an operation performed by the application instance 114 that does not match a corresponding data set 162 input to, or output by, the same operation performed by the application instance 124, the debugger 132 can output an indicator indicating that the operation that generated the data set 162 is a candidate for inspection. For example, the debugger can present, via the user interface of the data processing system 130, a view indicating the operation. The view also can indicate the data set 152 input to, or output by, the operation in the application instance 114, and the data set 162 input to, or output by, the operation in the application instance 124. In one arrangement, the debugger also can indicate value types for parameter values contained in the respective data sets 152, 162. Accordingly, the user can inspect the operation and the data sets 152, 162 to determine why the operation is behaving differently in the different computing environments 112, 122.

Further, responsive to receiving at least one data set 152 input to, or output by, an operation performed by the application instance 114 that does not match a corresponding data set 162 input to, or output by, the same operation performed by the application instance 124, the debugger 132 can replace the data set 162 with the data set 152 in the memory of the data processing system 120. For example, the debugger 132 can communicate the data set 152 to the debugging agent 126. The debugging agent 126 can replace, in the memory of the data processing system 120, the corresponding data set 162 with the data set 152. In illustration, the debugging agent 126 can replace the data set 162 in the call stack for the application instance 124 with the replacement data set 152.

The debugger 132 can communicate a next execution control command 150 to the debugging agents 116, 126, and the above processes can repeat until there are no further breakpoints reached in the application instances 114, 124. Because the data set 162 in the call stack for the application instance 124 can be replaced with the data set 152 when the data set 162, 152 for an operation do not match, the application instance 124 can execute additional operations using the data set 152 in lieu of the data set 162. Thus, assuming the data set 152 was properly generated, but the data set 162 was not, additional operations performed by the application instance 124 can be tested using proper the data set 152. Accordingly, the additional operations can be tested in a manner in which they are unaffected by results of a previous operation that may generate an incorrect data set. This can help a user identify operations, and data sets input to or output from such operations, which are candidates for inspection, while not being distracted analyzing operations that are functioning properly.

FIG. 2 is a flow chart illustrating an example of a method 200 of debugging an application. The method 200 can be performed by the debugger 132.

At step 202, the debugger 132 can initiate a stepwise execution of a first instance of an application 114 in a first computing environment 112 hosted by a first data processing system 110 and, in parallel, initiate the stepwise execution of a second instance of the application 124 in a second computing environment 122 hosted by a second data processing system 120, wherein the second computing environment 122 is different than the first computing environment 112.

At step 204, responsive to an execution step being performed by the first instance of the application 114 and the second instance of the application 124, the debugger 132 can determine whether a first data set 152 generated by an operation performed in the execution step by the first instance of the application 114 matches a second data set 162 generated by the operation performed in the execution step by the second instance of the application 124.

At step 206, responsive to determining that the first data set 152 does not match the second data set 162, the debugger 132 can replace, using a processor, in memory of the second data processing system 120, the second data set 162 with the first data set 152.

At step 208, responsive to at least one additional execution step being performed by the first instance of the application 114 and the second instance of the application 124, the debugger 132 can determine whether a third data set generated by at least one additional operation performed in the at least one additional execution step by the first instance of the application 114 matches a fourth data set generated by the at least one additional operation performed in the at least one additional execution step by the second instance of the application 124.

At step 210, responsive to determining that the third data set matches the fourth data set, the debugger 132 can output an indication that the operation that generated the fourth data set performed properly.

Figure 3:
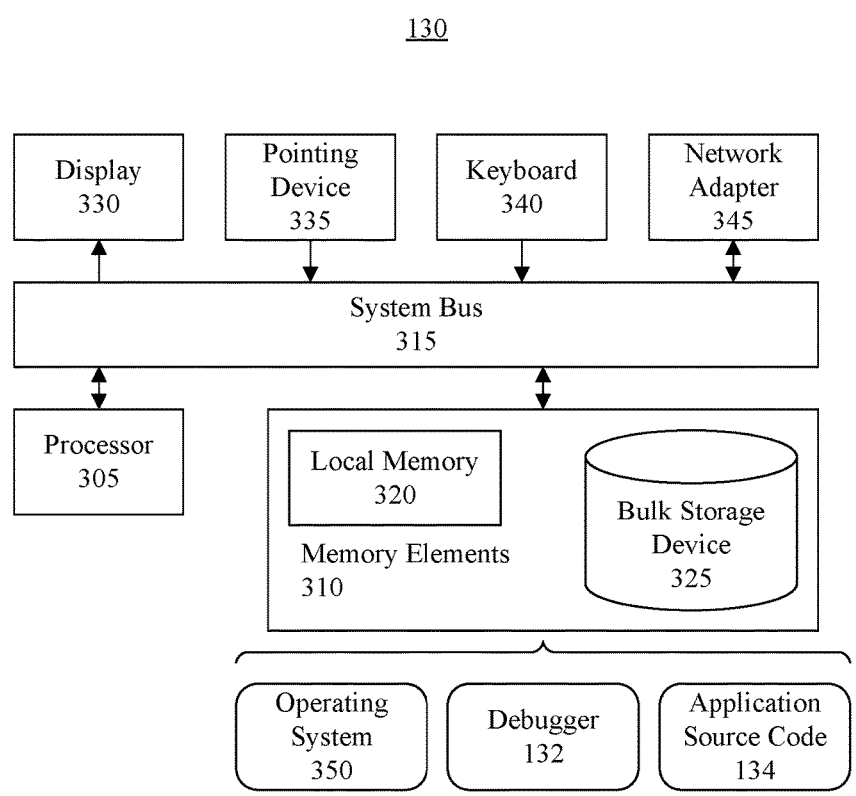
FIG. 3 is a block diagram illustrating example architecture for a data processing system.

FIG. 3 is a block diagram illustrating example architecture for the data processing system 130 of FIG. 1. The data processing system 130 can include at least one processor 305 (e.g., a central processing unit) coupled to memory elements 310 through a system bus 315 or other suitable circuitry. As such, the data processing system 130 can store program code within the memory elements 310. The processor 305 can execute the program code accessed from the memory elements 310 via the system bus 315. It should be appreciated that the data processing system 130 can be implemented in the form of any system including a processor and memory that is capable of performing the functions and/or operations described within this specification. For example, the data processing system 130 can be implemented as a server, a plurality of communicatively linked servers, a workstation, a desktop computer, a mobile computer, a tablet computer, a laptop computer, a netbook computer, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 130 also can include one or more cache memories (not shown) that provide temporary storage of at least some program code in order to reduce the number of times program code must be retrieved from the bulk storage device 325 during execution.

Input/output (I/O) devices such as a display 330, a pointing device 335 and a keyboard 340 can be coupled to the data processing system 130. The I/O devices can be coupled to the data processing system 130 either directly or through intervening I/O controllers. For example, the display 330 can be coupled to the data processing system 130 via a graphics processing unit (GPU), which may be a component of the processor 305 or a discrete device. One or more network adapters 345 also can be coupled to data processing system 130 to enable the data processing system 130 to become coupled to other systems, computer systems, remote printers, and/or remote storage devices through intervening private or public networks. Modems, cable modems, transceivers, and Ethernet cards are examples of different types of network adapters 345 that can be used with the data processing system 130.

As pictured in FIG. 3, the memory elements 310 can store the components of the data processing system 130, namely an operating system 350, the debugger 132, and the application source code 134. Being implemented in the form of executable program code, the operating system 350 and the debugger 132 can be executed by the data processing system 130. Further, the application source code 134 can be analyzed by the data processing system 130. Accordingly, the operating system 350, debugger 132, and source code 134 can be considered part of the data processing system 130. Moreover, the operating system 350, debugger 132, and source code 134 impart functionality when employed as part of the data processing system 130.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor programmed to initiate executable operations comprising:
initiating a stepwise execution of a first instance of an application in a first computing environment hosted by a first data processing system and, in parallel, initiating the stepwise execution of a second instance of the application in a second computing environment hosted by a second data processing system, wherein the second computing environment is different than the first computing environment;
responsive to an execution step being performed by the first instance of the application and the second instance of the application, determining whether a first data set generated by an operation performed in the execution step by the first instance of the application matches a second data set generated by the operation performed in the execution step by the second instance of the application;
responsive to determining that the first data set does not match the second data set, replacing in memory of the second data processing system, the second data set with the first data set;
responsive to at least one additional execution step being performed by the first instance of the application and the second instance of the application, determining whether a third data set generated by at least one additional operation performed in the at least one additional execution step by the first instance of the application matches a fourth data set generated by the at least one additional operation performed in the at least one additional execution step by the second instance of the application; and
responsive to determining that the third data set matches the fourth data set, outputting an indication that the operation that generated the fourth data set performed properly.

2. The system of claim 1, the executable operations further comprising:
responsive to determining that the first data set does not match the second data set, outputting an indication that the operation that generated the second data set is the candidate for inspection.

3. The system of claim 2, the executable operations further comprising:
outputting an indication of the second data set and an indication of a fifth data set input to the operation that generated the second data set.

4. The system of claim 1, wherein the first computing environment is hosted by a first operating system and the second computing environment is hosted by a second operating system that is different from the first operating system, wherein the first operating system and the second operating system are not different instance of the same operating system.

5. The system of claim 1, wherein the first computing environment is hosted by a first web browser and the second computing environment is hosted by a second web browser that is different from the first web browser, wherein the first web browser and the second web browser are not different instance of the same web browser.

6. The system of claim 1, wherein the first computing environment includes a first application programming interface used by the first instance of the application during execution that is different than a second application programming interface used by the second instance of the application during execution, wherein the first instance of the application does not use the second application programming interface during execution, and the first application programming interface and the second application programming interface are not different instances of the same application programming interface.

7. The system of claim 1, wherein the second computing environment includes service executed by the second data processing system during execution of the second instance of the application, and the first data processing system does not execute an instance of the service during execution of the first instance of the application.

8. A computer program product comprising a computer readable storage medium having program code stored thereon, the program code executable by a processor to perform a method comprising:
initiating, by the processor, a stepwise execution of a first instance of an application in a first computing environment hosted by a first data processing system and, in parallel, initiating the stepwise execution of a second instance of the application in a second computing environment hosted by a second data processing system, wherein the second computing environment is different than the first computing environment;
responsive to an execution step being performed by the first instance of the application and the second instance of the application, determining, by the processor, whether a first data set generated by an operation performed in the execution step by the first instance of the application matches a second data set generated by the operation performed in the execution step by the second instance of the application;
responsive to determining that the first data set does not match the second data set, replacing, by the processor, in memory of the second data processing system, the second data set with the first data set;
responsive to at least one additional execution step being performed by the first instance of the application and the second instance of the application, determining, by the processor, whether a third data set generated by at least one additional operation performed in the at least one additional execution step by the first instance of the application matches a fourth data set generated by the at least one additional operation performed in the at least one additional execution step by the second instance of the application; and
responsive to determining that the third data set matches the fourth data set, outputting, by the processor, an indication that the operation that generated the fourth data set performed properly.

9. The computer program product of claim 8, the method further comprising:
responsive to determining that the first data set does not match the second data set, outputting an indication that the operation that generated the second data set is the candidate for inspection.

10. The computer program product of claim 8, wherein the first computing environment is hosted by a first operating system and the second computing environment is hosted by a second operating system that is different from the first operating system, wherein the first operating system and the second operating system are not different instance of the same operating system.

11. The computer program product of claim 8, wherein the first computing environment is hosted by a first web browser and the second computing environment is hosted by a second web browser that is different from the first web browser, wherein the first web browser and the second web browser are not different instance of the same web browser.

12. The computer program product of claim 8, wherein the first computing environment includes a first application programming interface used by the first instance of the application during execution that is different than a second application programming interface used by the second instance of the application during execution, wherein the first instance of the application does not use the second application programming interface during execution, and the first application programming interface and the second application programming interface are not different instances of the same application programming interface.

13. The computer program product of claim 8, wherein the second computing environment includes service executed by the second data processing system during execution of the second instance of the application, and the first data processing system does not execute an instance of the service during execution of the first instance of the application.

14. The computer program product of claim 10, further comprising:
outputting an indication of the second data set and an indication of a fifth data set input to the operation that generated the second data set.

* * * * *